(12) United States Patent
McElroy

(10) Patent No.: US 9,450,632 B1
(45) Date of Patent: Sep. 20, 2016

(54) PORTABLE ELECTRONIC DEVICE DOCKING STATION

(71) Applicant: Lori M. McElroy, Snyder, TX (US)

(72) Inventor: Lori M. McElroy, Snyder, TX (US)

( * ) Notice: Subject to any disclaimer, the term of this patent is extended or adjusted under 35 U.S.C. 154(b) by 0 days.

(21) Appl. No.: 14/817,841

(22) Filed: Aug. 4, 2015

Related U.S. Application Data

(60) Provisional application No. 62/032,806, filed on Aug. 4, 2014.

(51) Int. Cl.
*H04B 1/3877* (2015.01)
*G06F 1/16* (2006.01)

(52) U.S. Cl.
CPC ........... *H04B 1/3877* (2013.01); *G06F 1/1632* (2013.01)

(58) Field of Classification Search
CPC ..................... H04B 1/3877; G06F 1/1632
See application file for complete search history.

(56) References Cited

U.S. PATENT DOCUMENTS

| 5,113,427 | A | 5/1992 | Ryoichi et al. |
| 8,481,832 | B2 | 7/2013 | Lloyd |
| 9,191,074 | B2 * | 11/2015 | Murar |
| 2002/0032042 | A1 * | 3/2002 | Poplawsky et al. .......... 455/564 |
| 2002/0163780 | A1 * | 11/2002 | Christopher ................... 361/686 |
| 2008/0019082 | A1 * | 1/2008 | Krieger et al. ............... 361/679 |
| 2009/0321483 | A1 | 12/2009 | Froloff |
| 2010/0097239 | A1 | 4/2010 | Campbell et al. |
| 2012/0265913 | A1 * | 10/2012 | Suumaki et al. ............. 710/303 |
| 2013/0006526 | A1 | 1/2013 | Banus |
| 2013/0093205 | A1 | 4/2013 | Stephan |
| 2013/0277520 | A1 * | 10/2013 | Funk et al. ................. 248/274.1 |
| 2013/0297844 | A1 | 11/2013 | Rosenberg et al. |
| 2013/0304280 | A1 | 11/2013 | Wen et al. |
| 2013/0304959 | A1 * | 11/2013 | Chiang ......................... 710/303 |
| 2013/0328670 | A1 | 12/2013 | Brüninghaus et al. |
| 2014/0270689 | A1 * | 9/2014 | Chau et al. ................... 386/227 |
| 2015/0072555 | A1 * | 3/2015 | Riddiford et al. ............ 439/575 |

* cited by examiner

*Primary Examiner* — Brandon Miller
(74) *Attorney, Agent, or Firm* — Robert C. Montgomery; Montgomery Patent and Design, LP.

(57) ABSTRACT

A portable electronic device docking station adapted for use in a vehicle provides a securement mechanism, electrical power connection, and communication synchronization system to enable hands-free use of the portable electronic device while attached thereto. The docking station also enables communication with other electronic devices GPS function. The station enables a user to exercise command and control of any synchronized device.

18 Claims, 5 Drawing Sheets

PORTABLE ELECTRONIC DEVICE DOCKING STATION

RELATED APPLICATIONS

The present invention is a continuation of, was first described in, and claims the benefit of U.S. Provisional Application No. 62/032,806, filed Aug. 4, 2014, the entire disclosures of which are incorporated herein by reference.

FIELD OF THE INVENTION

The present invention relates generally to a docking station for holding and enabling recharging of a portable electronic device and adapted for use in a vehicle.

BACKGROUND OF THE INVENTION

Street and highway safety is at the forefront of concerns when speaking in regards to public safety. With the ever increasing volume of cars on the road, deaths, and injuries resulting from traffic accidents continue to be an all too common occurrence. While some of these accidents are related to weather, poor driving conditions, mechanical failure, and the like, many are due to distracted driving, primarily from using, talking, or texting on a mobile telephone. Even though hands-free features have helped somewhat, the phone must be positioned so that it can be seen without being held. Of course there are also many phones without hands-free capability as well. Accordingly, there exists a need for a means by which hands-free functionality can be provided to almost any type of mobile telephone or smart phone in a manner that addresses the above concerns. The use of the docking station provides the ability to enjoy all features of a mobile telephone or smart phone in a hands-free and safe manner regardless of the phone's internal capabilities.

SUMMARY OF THE INVENTION

It is therefore an object of the present invention to provide such a docking station, including a base having a camera mounted within a front face, a memory card slot located on a periphery, a microphone also located on the periphery, and an interface cable located on said periphery thereof. The memory card slot is capable of electrically connecting a memory card thereto. The camera, the memory card slot, the microphone, and the interface cable are each configured to be in electrical communication with an external power source. The docking station also has a mounting bracket retained within a cavity of the base capable of being affixed to a support structure. A tray with a sill forming a trough is capable of supporting a portable electronic device in either a generally vertical of generally horizontal orientation. A flexible and adjustable stem attaches the tray to the base. The tray further includes a pair of side adjustment means located on opposing sides configured to adjustably secure opposing sides of the portable electronic device, and a top adjustment means located on a top configured to adjustably secure a top of the portable electronic device.

In at least one (1) embodiment, electronic circuitry is also located within the base and configured to be in electrical communication with the camera, the memory card slot, the microphone, and the interface cable. A power cord is configured to be in electrical communication with an external power source and a power switch is in electrical communication between the said power cord and the electronic circuitry.

In at least one (1) embodiment, the electronic circuitry comprises voice recognition circuitry to receive a voice command and selectively control said camera, said memory card slot; and said portable electronic device.

In at least one (1) embodiment, electronic circuitry commands the camera to record an image, convert it to data, and transfer the data to the memory card. In the event the memory card is full, the electrical circuitry commands the memory card to delete sufficient oldest data in order to transfer said image thereto.

It is a further object of the tray to further include a reveal extending generally upward and outward at an obtuse angle from the sill to retain a portion of a lower end of the portable electronic device.

It is a further object of the tray to have a tray aperture configured to permit routing of the interface cable therethrough. In at least one (1) embodiment, the aperture is a slot configured to have a width generally coextensive with a width of the portable electronic device in order to accommodate different sizes of connectors and different locations on the portable electronic device to connect to.

It is another object of the invention to have a knuckle connecting a second end of the stem to the tray.

It is yet another object of the invention to provide specific features for the pair of side adjustment means and the top adjustment means. Such features may include at least one (1) rod adjustment mount extending outward from the tray, each including a rod clamp, a stabilizer plate, and at least one (1) support rod, each extending outward from the stabilizer plate and slidably attached to an individual rod clamp. Each rod clamp secures an individual support rod such that the stabilizer plate is positioned at a distance relative to the tray. Each stabilizer plate further includes a pad located on a surface facing said tray to protect the portable electronic device during movement and contact of each of the pair of side adjustment means and top adjustment means.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
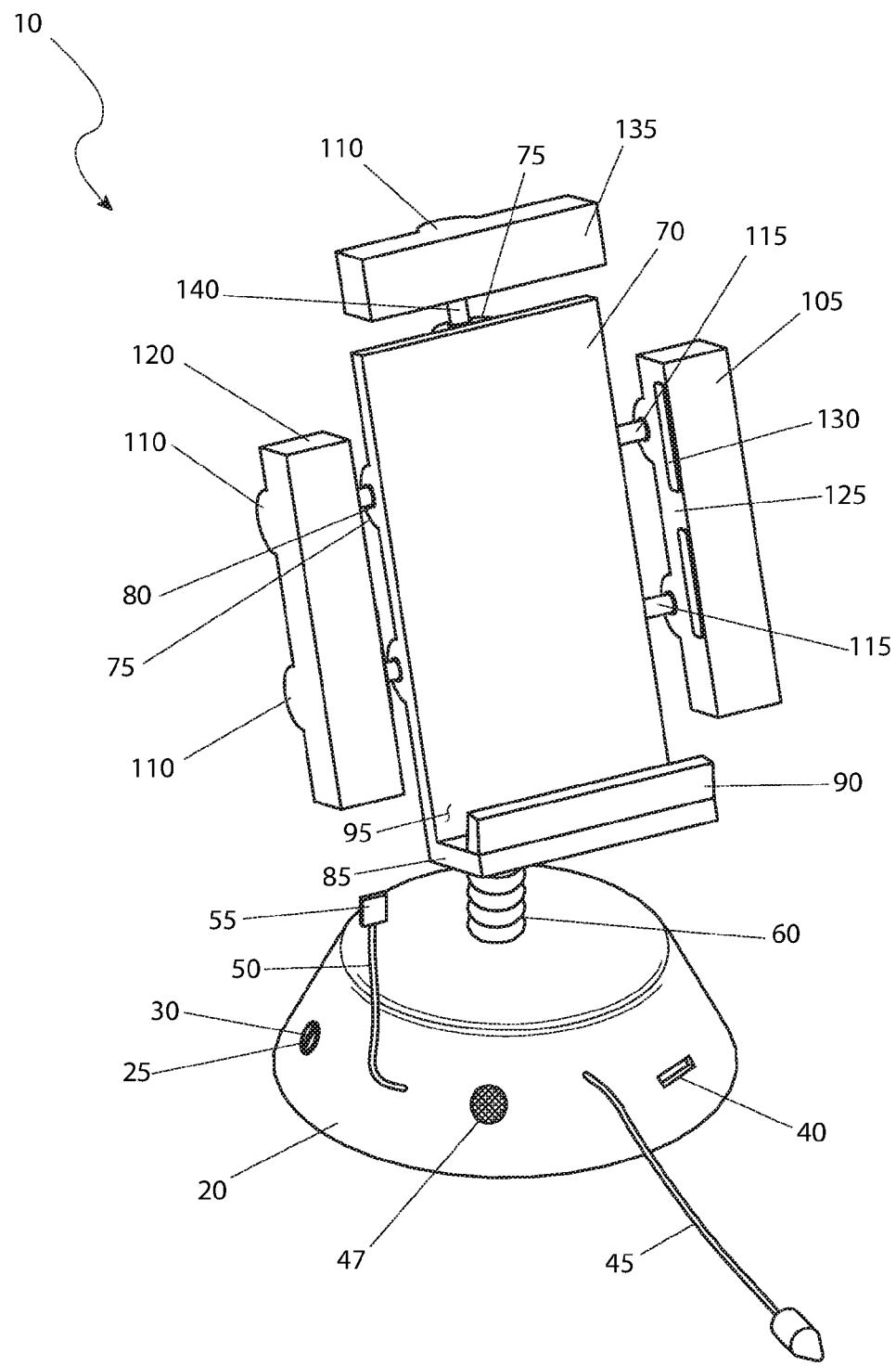
FIG. 1 is an isometric view of a docking station 10 for a portable electronic device 200 in accordance with the preferred embodiment of the present invention.

10 docking station
20 base 25 mounting aperture
30 mounting fastener
35 camera
40 memory card slot
45 power cord
47 microphone
50 interface cable
55 communication/charging connector
60 adjustable stem
65 knuckle
70 tray
75 rod adjustment mount
80 rod clamp
85 sill
90 reveal
95 trough
100 auxiliary aperture
105 first stabilizer
110 rod housing
115 horizontal support rod
120 second stabilizer
125 stabilizer inner face
130 pad
135 top stabilizer
140 vertical support rod
145 electronic circuitry
150 voice recognition circuit
155 electronic device interface circuit
200 portable electronic device
300 first functional block
305 second functional block
310 third functional block
315 first operational block
320 fourth functional block
325 second operational block
330 fifth functional block
335 sixth functional block
340 seventh functional block

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a portable electronic device 200 docking station (herein referred to as the "apparatus") 10, which provides a means to secure a portable electronic device 200 to a support structure such as a dashboard, or other permanent structure, within a vehicle in a prominent position so as to allow the operator of that vehicle, or a passenger therein, to operate that portable electronic device 200 in a voice-activated mode. In the ensuing discussion, the front, or the face, of the apparatus 10 will refer to that portion into which the portable electronic device 200 is inserted and retained, while the rear, or back, will refer to that side opposite from the projection of a sill 85 from a tray 70

Figure 2:
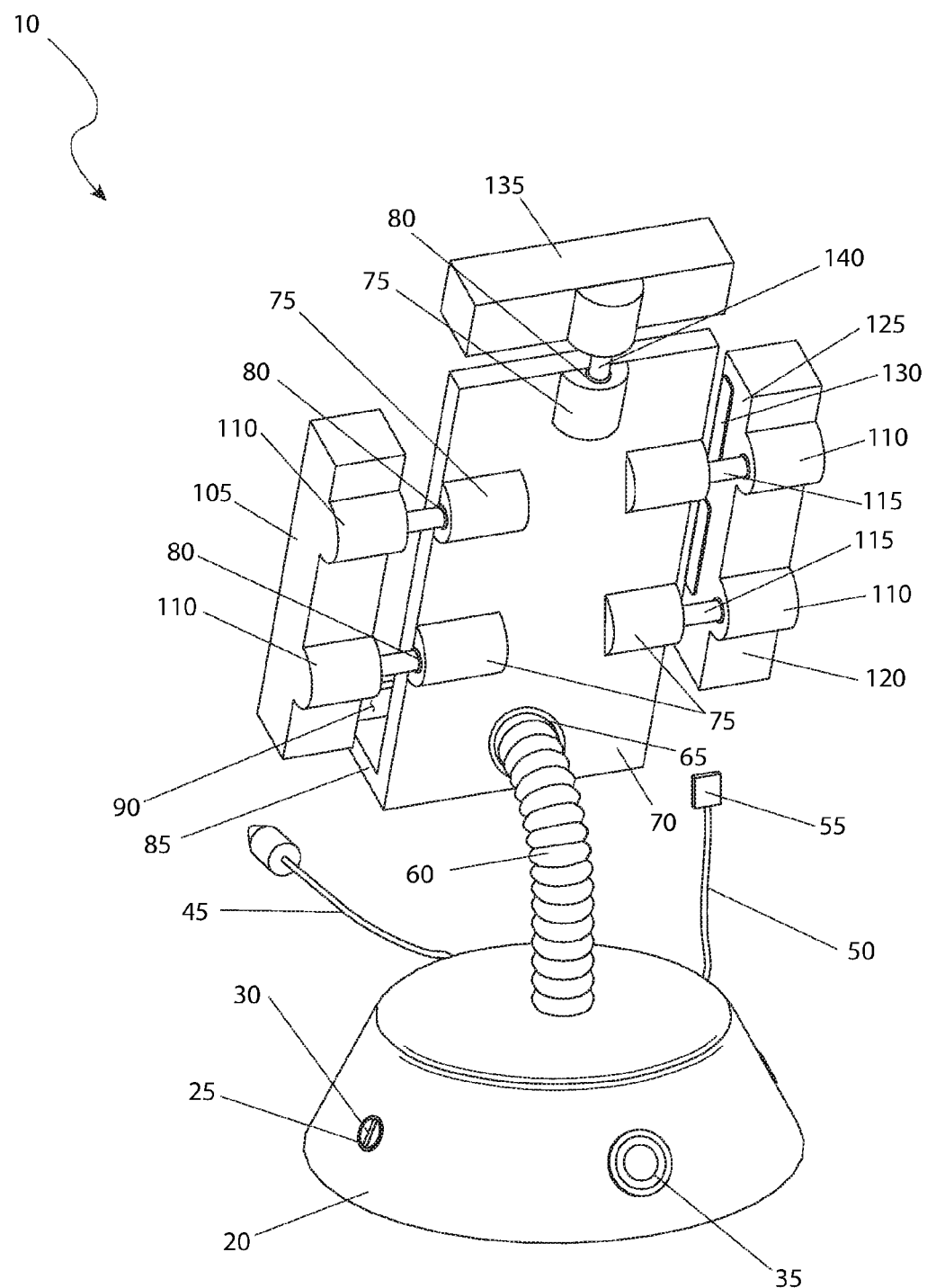
FIG. 2 is an isometric view of the apparatus 10 as viewed from the rear in accordance with the preferred embodiment of the present invention.

Referring now to FIG. 1, an isometric view of a front face, and FIG. 2, an isometric view of a rear face of the apparatus 10, according to the preferred embodiment of the present invention, are disclosed. The apparatus 10 includes a base 20 having a forward-facing camera and a memory card slot 40, a microphone 47, a tray 70 with a sill 85 intended for the support of a portable electronic device 200 in a more or less vertical orientation, and a flexible, adjustable stem 60. It is appreciated that an embodiment of the apparatus 10 can be used with a portable electronic device 200 oriented in a general horizontal orientation with the same features still applying. The base 20 is configured to be generally a truncated, conical shape, of sufficient diameter and height to accommodate the electronic devices intended to be housed therein, with an internal cavity capable of receiving a mounting bracket (not shown). The upper surface of the base 20 is preferably planar and perpendicular to a central axis thereof. In alternate embodiments the upper surface may be hemispherical or arcuate with an orientation other than perpendicular to a central axis. All points on a lower edge of the base 20 would be coplanar. It is envisioned that the base 20 will be permanently fixed to the dashboard, or other structure, with a mounting bracket. Disposed upon the surface of the base 20, preferably at diametrically opposite locations, will be at least two (2) mounting apertures 25. The mounting apertures 25 will be provided with mounting fasteners 30 for securing the base 20 to the mounting bracket (not shown), preferably by means of a threaded engagement of the mounting fasteners 30 into the mounting bracket. In an alternate embodiment, another technique may be employed to attach the base 20 to the mounting bracket, such as with the use of set screws or the like. The base 20 may be composed of a stamped, or cast, metal having a protective coating, or plating, to inhibit corrosion as well as increasing aesthetic appeal. It is understood that other materials, such as rigid thermoplastics, may be utilized without limiting the scope of the apparatus 10. A camera 35 will be mounted within a portion of the base 20, preferably in a location which would yield a forward-facing vantage point as seen by an operator. The camera 35 may be any of a variety of commercially available, low-voltage, digital video image capturing devices, equipped with a wide angle lens, capable of transmitting data to a digital memory card. A memory card slot 40, containing all necessary electro-mechanical devices necessary to receive, place data onto, and eject a standard, commercially available memory card, will be located at some point along the periphery of the base 20. Disposed along a forward portion of the base 20 is a power cord 45 with a jack at a first end, configured to be inserted into a standard power receptacle of the vehicle. An interface cable 50 is also attached at a first end to some portion of the base 20 and terminates at a second end with a communication/charging connector 55 for selectively providing power necessary to recharge any power supply inside of the portable electronic device 200.

A first end of an adjustable stem 60 is affixed to a top surface of the base 20. The adjustable stem 60 is an interconnected, segmented, tubular structure used to support the tray 70, and thus the portable electronic device 200, in a spatially adjustable configuration relative to the base 20. The adjustable stem 60 is preferably composed of metallic segments with a polymer covering secured at both ends. A second end of the adjustable stem 60 is secured to a rear face of the tray 70 at a knuckle 65. The knuckle 65 is configured to be a rigid union between some projecting feature on the rear face of the tray 70 and an adaptive connector disposed at the second end of the adjustable stem 60. In an alternate embodiment the knuckle 65 may be provided with some measure of flexibility by utilizing a ball-and-socket joint.

Figure 3A:
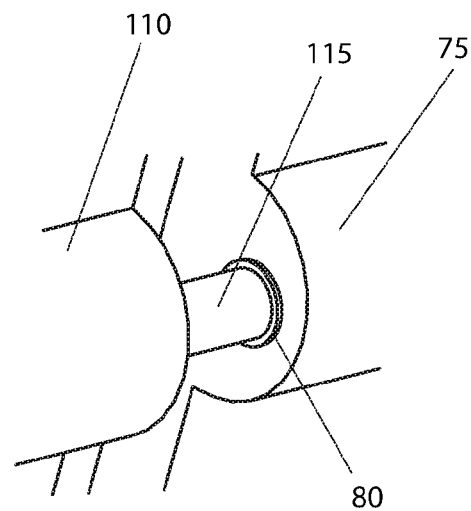
FIG. 3*a* is an isolated view of a rod adjustment mount 75 on a tray 70 of the apparatus 10 in accordance with the preferred embodiment of the present invention.
Figure 3B:
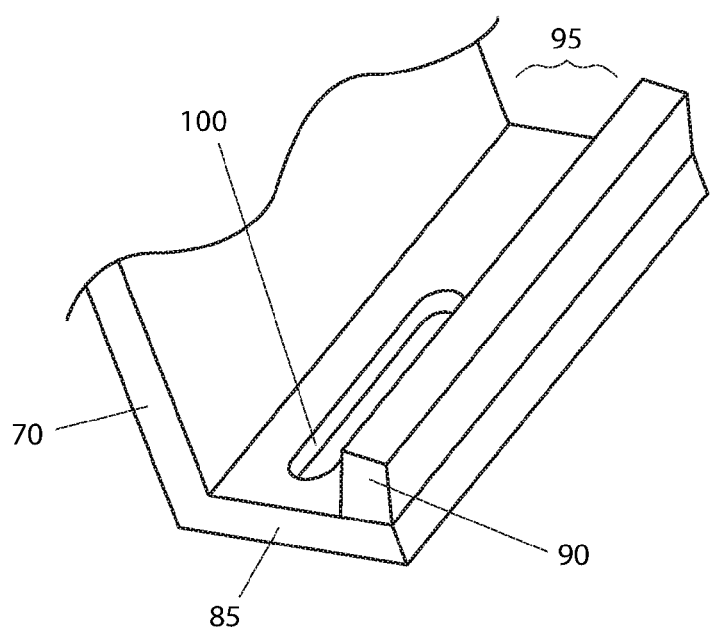
FIG. 3*b* is an isolated view of an auxiliary aperture 100 in a sill 85 of the apparatus 10 in accordance with the preferred embodiment of the present invention.

The tray 70 is configured to be planar along a front face for the disposition of the portable electronic device 200. The tray 70 is preferably composed of a rigid thermoplastic material and formed in an injection molding process and as such may be presented in a wide variety of colors and surface texture patterns to suit the taste of a user. It is understood that other materials, such as die cast metals, may be utilized without limiting the scope of the apparatus 10. Disposed along a lower edge of the tray 70 and projecting perpendicularly therefrom is a sill 85 formed as an integral part of the tray 70. The sill 85 is of a sufficient depth to accommodate one (1) of a variety of portable electronic devices 200 supported thereon. Attached to the sill 85, and projecting therefrom at an obtuse angle is a reveal 90. The reveal 90 is configured to be of an appropriate height to retain a lower end of a portable electronic device 200 on the sill 85. The space defined by the front face of the tray 70, the upper surface of the sill 85, and a rear face of the reveal 90 is a trough 95. The trough 95 is configured to be a convergent space from top to bottom. It is this trough 95 which actually accepts a lower end of the portable electronic device 200 for retention. An auxiliary aperture 100, as seen in FIG. 3b, is disposed in the sill 85 to accommodate the insertion of the communication/charging connector 55 of the interface cable 50 into a charging receptacle on the portable electronic device 200. The auxiliary aperture 100 is configured to be a slot sufficiently long to provide for a variability of locations of such a charging receptacle on a variety of portable electronic devices 200.

A plurality of rod adjustment mounts 75 is disposed, preferably in a uniform pattern, on a rear face of the tray 70 as illustrated in FIG. 2. These rod adjustment mounts 75 accommodate the insertion of cylindrical horizontal support rods 115 of a first stabilizer 105 and a second stabilizer 120 as well as a vertical support rod 140 of a top stabilizer 135. The rod adjustment mounts 75 are each provided with a rod clamp 80 which is a friction device intended to secure the relative positions of the horizontal support rods 115 and the vertical support rod 140. It is envisioned that the rod clamps 80, as more clearly depicted in FIG. 3a, would be comprised of a thermoplastic material, so as to obviate scoring of the support rods 115, 140, having an internal diameter appropriately sized to result in a slight interference fit with the diameter of the support rods 115, 140. The first stabilizer 105 and the second stabilizer 120 are each generally rectangular polyhedrons with at least two (2) rod housings 110 disposed along a rear face thereof. The rod housings 110 are each configured to receive and retain a horizontal support rod 115 within a cylindrical cavity (not shown) therein. The horizontal support rods 115 are each composed of a rigid thermoplastic, or metallic, cylinder. The first stabilizer 105 and the second stabilizer 120 are preferably composed of a rigid thermoplastic and formed in an injection molding process. Disposed along a stabilizer inner face 125 of each stabilizer 105, 120 is at least one (1) pad 130. The pad 130 is composed of rubber, or a rubber-like material, intended to present a resilient, high-friction surface for the retention of the portable electronic device 200. The first stabilizer 105 is intended to be attached to a first side of the tray 70 by the insertion of the horizontal support rods 105 into the rod adjustment mounts 75. The second stabilizer 120 is attached in a symmetrical manner to a second side of the tray by the insertion of the horizontal support rods 105 retained within the rod housings 110 of the second stabilizer 120 into the rod adjustment mounts 75.

A top stabilizer 135 is configured to be a rigid thermoplastic rectangular polyhedron with preferably one (1) rod housing 110 disposed along a rear face in a manner similar to the first stabilizer 105 and the second stabilizer 120. The rod housing 110 of the top stabilizer 135 will receive and retain a vertical support rod 140. The top stabilizer 135 is attached to an upper end of the tray 70 by the insertion of the vertical support rod 140 retained within the rod housing 110 into the rod adjustment mount 75. In use, a portable electronic device 200, such as a smart phone, is inserted into the trough 95 and placed upon the sill 85 with a rear face of the portable electronic device 200 in contact and supported in part by the vertical front face of the tray 70. The first stabilizer 105 and the second stabilizer 120 are adjusted in turn to fit snugly against the vertical side edges of the portable electronic device 200. The top stabilizer 135 is then adjusted to fit snugly against the upper edge of the portable electronic device 200.

Figure 4:
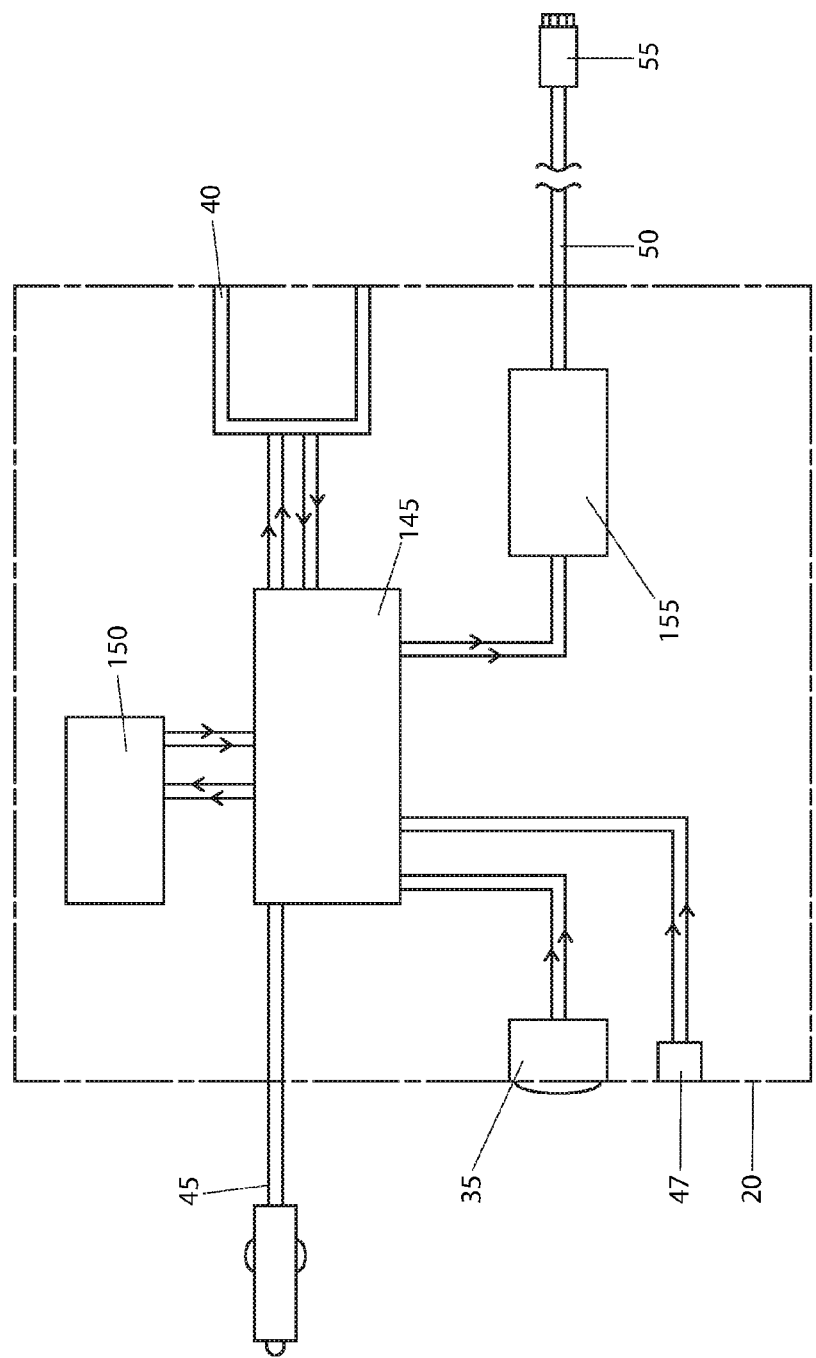
FIG. 4 is an operational block diagram of the apparatus 10 in accordance with the preferred embodiment of the present invention; and, FIG. 5 is a flow chart depicting the operational sequence provided by the apparatus 10 in according with the preferred embodiment of the present invention.

Referring now to FIG. 4, an operational block diagram of the apparatus 10, according to the preferred embodiment of the present invention, is disclosed. All electrical power to the apparatus 10, but not necessarily to the portable electronic device 200, is supplied via the power cord 45. The electronic circuitry 145 within the base 20 is in electrical communication with the power cord 45, the interface cable 50, the camera 35, the microphone 47, and the memory card slot 40. Prior to operating the vehicle, a user would check the battery charge level of the portable electronic device 200, place the portable electronic device 200 into the apparatus 10 as previously described, insert a memory card into the memory card slot 40, and connect the power cord 45 of the apparatus 10 to a standard power receptacle within the vehicle. If the battery of the portable electronic device 200 requires immediate recharging, then the user would insert the communication/charging connector 55 of the interface cable 50 into the charge receptacle of the portable electronic device 200. This may require routing portions of the interface cable 50 through the auxiliary aperture 100 in the sill 85. When electrical power is supplied to the apparatus 10 the electrical circuitry 145 energizes the camera 35 and the memory card slot 40. The camera 35 begins to record images available from that vantage point and transfers the data to the memory card in the memory card slot 40. When the memory card has been filled to available capacity, the electronic circuitry 145 signals the memory card slot 40 to rewrite the oldest image in a continuous loop format. Such a format ensures that the latest image captured by the camera 35 are always available for subsequent viewing.

It is envisioned that alternate embodiments may be equipped with ON/OFF switches for selectively activating and deactivating the electronic circuitry 145. Various inputs from the camera 35 and/or the microphone 47 are provided as an input signal to the electronic circuitry 145. Output actions by the electronic circuitry 145 will be performed based upon internal operating sequences to be described herein below. Voice signals are sent to a voice recognition circuit 150 for further processing. Actionable events from the voice recognition circuit 150 are returned to the electronic circuitry 145 as appropriate. Video signals are passed to the memory card slot 40 for storage as aforementioned described. Control signals are returned from the memory card slot 40 to the electronic circuitry 145 as required to indicate capacity as well as possible viewing on the portable electronic device 200 by passing the video signals along the interface cable 50 and the communication/charging connector 55. It is envisioned that the apparatus 10 will work with a wide variety of manufacturer's makes and models of various portable electronic devices 200, all of which requires varying input and output parameters of the communication/charging connector 55. This variable control is accomplished by an electronic device interface circuit 155 which conditions the input/output signals that are passed along the interface cable 50 and subsequently the communication/charging connector 55.

Figure 5:
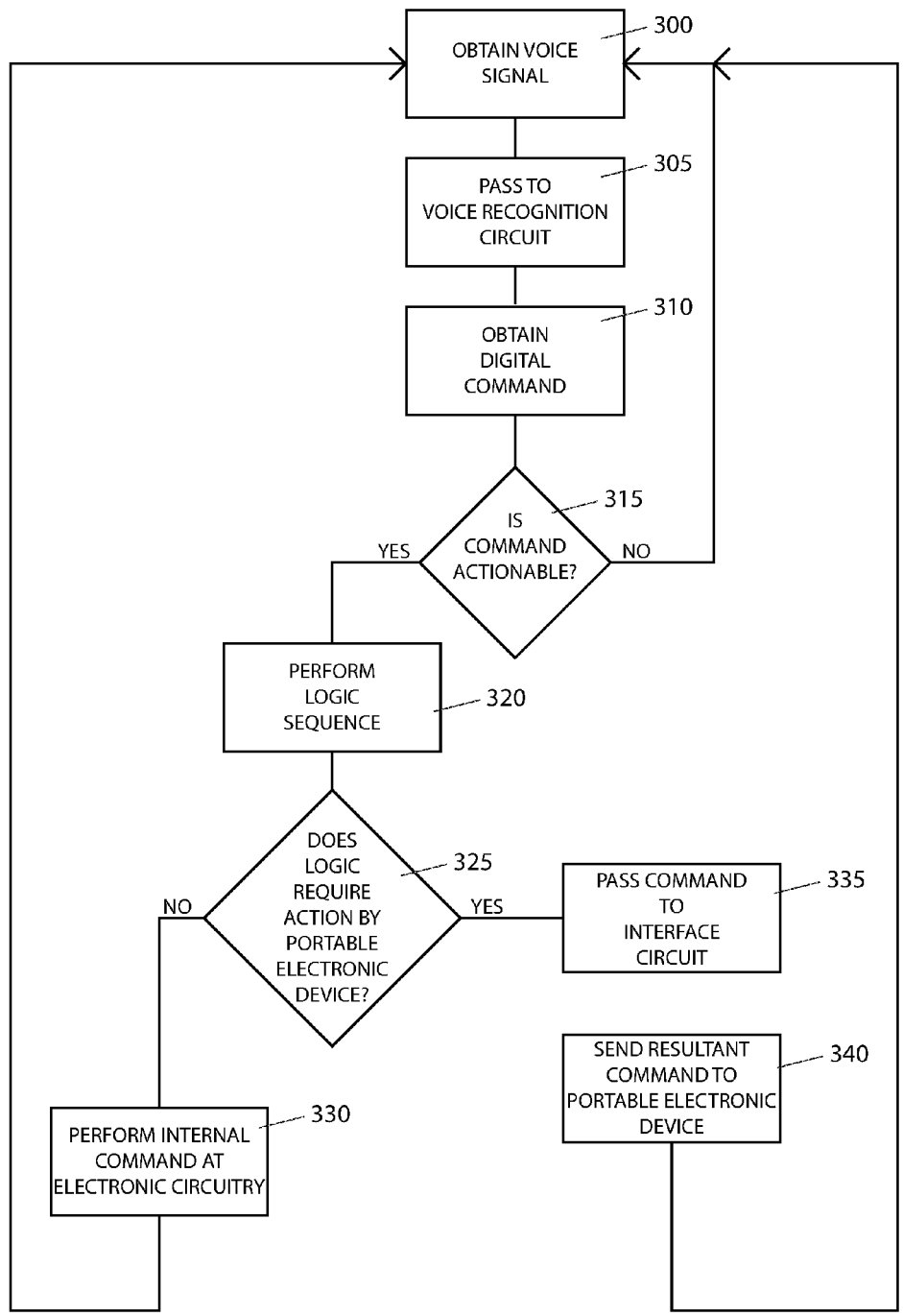

Referring finally to FIG. 5, a flow chart depicting the operational sequence provided by the apparatus 10 in according with the preferred embodiment of the present invention is depicted. The sequence is initiated at a first functional block 300 which obtains the analog voice signal from the microphone 47 (as shown in FIG. 4). A second functional block 305 then passes the signal along the voice recognition circuit 150 (as shown in FIG. 4). The digital command, if any, is obtained at a third functional block 310. A first operational block 315 then determines if the command is actionable. A negative response returns control the first functional block 300, while a positive response then results in a logic sequence being performed at a fourth functional block 320. It is then necessary to determine if the resultant logic sequence needs to be performed internal to the apparatus 10, such as control of the camera 35 (as shown in FIG. 4) or external to the apparatus 10 such as texting, phone communication, or the like as performed by the portable electronic device 200 (as shown in FIG. 1). Said decision is performed at a second operational block 325. A negative response results in said action being performed by the electronic circuitry 145 (as shown in FIG. 4) at a fifth functional block 330, while a positive response requires further conditioning of the command at a sixth functional block 335 by the interface circuit 155 (as shown in FIG. 4) prior to sending the conditioned command at a seventh functional block 340, whereupon logic control returns the first functional block 300 in a cyclical manner.

In accordance with the invention, the illustrated embodiment can be utilized by an enabled user in a simple and straightforward manner with little or no training. After initial purchase or acquisition of the apparatus 10, it would be installed as indicated in FIG. 1. The method of installing and utilizing the apparatus 10 may be achieved by performing the following steps: acquiring a model of the apparatus 10 having a desired style to suit the taste of a user; installing the mounting bracket permanently to the dashboard, or other suitable surface, at the discretion of the user; mounting the base 20 to the mounting bracket by adjusting the mounting fasteners 30; checking the battery charge level of the portable electronic device 200; placing the portable electronic device 200 into the apparatus 10 as previously discussed; adjusting the first stabilizer 105, the second stabilizer 120, and the top stabilizer 135 for a secure fit of the portable electronic device 200 in the apparatus; inserting a memory card into the memory card slot 40; connecting the power cord 45 to a convenient standard power receptacle in the vehicle; connecting the interface cable 50 to the portable electronic device 200 if the battery requires recharging; activating the portable electronic device 200 and driving normally while utilizing the portable electronic device 200 in a hands-free, voice-activated manner. Various commands will be performed internal to the apparatus 10 such as camera 35 control of the memory card slot 40. Other commands will be passed to the portable electronic device 200 via the interface cable 50 and the communication/charging connector 55. The portable electronic device 200 should be removed from the apparatus 10 upon arriving at the desired destination. Subsequent utilization of the apparatus 10 would not require those steps involved with the original installation.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:
1. A docking station, comprising:
a base comprising:
  a camera mounted within a front face thereof;
  a memory card slot located on a periphery thereof, wherein said memory card slot is capable of electrically connecting a memory card thereto; and
  an interface cable located on said periphery thereof, wherein said camera, said memory card slot, and said interface cable are configured to be in electrical communication with an external power source;
a flexible and adjustable stem having a first end attached to a top portion of said base and a second end;
a tray attached to said second end of said stem, wherein said tray comprises:
  a top;
  a bottom opposite said bottom;
  a first side;
  a second side opposite said first side; and
  a sill extending outwardly from said bottom of said tray and forming a trough capable of supporting a portable electronic device in either a generally vertical or generally horizontal orientation;
a first side stabilizer adjustably connected to said first side of said tray;
a second side stabilizer adjustably connected to said second side of said tray; and
a top stabilizer adjustably connected to said top of said tray,
wherein each of said first side stabilizer, said second side stabilizer and said top stabilizer comprises:
  at least one support rod capable of extending outwardly from and retracting into said tray;
  a stabilizer plate connected to an end of said support rod, and
wherein a position of said stabilizer plate of each of said first side stabilizer, said second side stabilizer and said top stabilizer relative to said tray is adjustable to make selective contact with said portable electronic device supported by said sill.
2. The docking station of claim 1, wherein said base further comprises a truncated, conical shape capable of accommodating said portable electronic device.

3. The docking station of claim 2, wherein said base comprises at least one mounting aperture, each for receiving a fastening means for fastening said docking station to a support structure.

4. The docking station of claim 1, wherein said tray further comprises a reveal extending generally upward and outward at an obtuse angle from said sill, said reveal configured to retain a portion of a lower end of said portable electronic device on said sill.

5. The docking station of claim 1, wherein said tray further comprises a tray aperture configured to permit routing of said interface cable therethrough.

6. The docking station of claim 5, wherein said aperture is further a slot configured to have a width generally coextensive with a width of said portable electronic device.

7. The docking station of claim 1, further comprising a knuckle connecting said second end of said stem to said tray.

8. The docking station of claim 1, wherein each stabilizer plate further comprises a pad located on a surface facing said tray.

9. The docking station of claim 1, further comprising a microphone configured to be in electrical communication with said external power source.

10. A docking station, comprising:
a base comprising:
  a camera mounted within a front face thereof;
  a memory card slot located on a periphery thereof, wherein said memory card slot is capable of electrically connecting a memory card thereto;
  a microphone located on said periphery thereof;
  an interface cable located on said periphery thereof; and
  electronic circuitry located within said base,
  wherein said camera, said memory card slot, said microphone, and said interface cable are configured to be in electrical communication with said electronic circuitry, and
  wherein said electronic circuitry comprises voice recognition circuitry to receive a voice command and selectively control said camera, said memory card slot; and said portable electronic device;
a power cord configured to be in electrical communication with an external power source;
a power switch in electrical communication between said power cord and said electronic circuitry;
a mounting bracket retained within a cavity of said base;
a flexible and adjustable stem having a first end attached to a top portion of said base and a second end;
a tray attached to said second end of said stem, wherein said tray comprises:
  a top;
  a bottom opposite said bottom;
  a first side;
  a second side opposite said first side; and
  a sill extending outwardly from said bottom of said tray and forming a trough capable of supporting a portable electronic device in either a generally vertical or generally horizontal orientation;
a first side stabilizer adjustably connected to said first side of said tray;
a second side stabilizer adjustably connected to said second side of said tray; and
a top stabilizer adjustably connected to said top of said tray,
wherein each of said first side stabilizer, said second side stabilizer and said top stabilizer comprises:
  at least one support rod capable of extending outwardly from and retracting into said tray;
  a stabilizer plate connected to an end of said support rod, and
wherein a position of said stabilizer plate of each of said first side stabilizer, said second side stabilizer and said top stabilizer relative to said tray is adjustable to make selective contact with said portable electronic device supported by said sill.

11. The docking station of claim 10, wherein said base further comprises a truncated, conical shape capable of accommodating said portable electronic device.

12. The docking station of claim 11, wherein said base comprises at least one mounting aperture, each for receiving a fastening means for fastening said docking station to a support structure.

13. The docking station of claim 10, wherein said tray further comprises a reveal extending generally upward and outward at an obtuse angle from said sill, said reveal configured to retain a portion of a lower end of said portable electronic device on said sill.

14. The docking station of claim 10, wherein said tray further comprises a tray aperture configured to permit routing of said interface cable therethrough.

15. The docking station of claim 14, wherein said aperture is further a slot configured to have a width generally coextensive with a width of said portable electronic device.

16. The docking station of claim 10, further comprising a knuckle connecting said second end of said stem to said tray.

17. The docking station of claim 10, wherein each stabilizer plate further comprises a pad located on a surface facing said tray.

18. The docking station of claim 10, wherein:
said electronic circuitry commands said camera to record an image, convert it to data, and transfer said data to said memory card; and,
wherein said electrical circuitry commands said memory card to delete sufficient oldest data if said memory card is full in order to transfer said image thereto.

* * * * *